United States Patent [19]

Belisle et al.

[11] Patent Number: 4,763,858
[45] Date of Patent: Aug. 16, 1988

[54] DEFLECTABLE JET ENGINE INLET

[75] Inventors: Joseph A. Belisle, West Babylon; Marshall J. Corbett, E. Northport, both of N.Y.

[73] Assignee: Grumman Aerospace Corporation, Bethpage, N.Y.

[21] Appl. No.: 826,513

[22] Filed: Feb. 5, 1986

[51] Int. Cl.⁴ .............................................. B64D 33/02
[52] U.S. Cl. ................................ 244/53 B; 244/53 R; 137/15.1
[58] Field of Search .................... 244/53 B, 53 R; 137/15.1, 15.2

[56] References Cited

U.S. PATENT DOCUMENTS

| | | | |
|---|---|---|---|
| 2,604,278 | 7/1952 | Johnson | 244/53 |
| 2,632,295 | 3/1953 | Price | 244/53 |
| 2,699,906 | 1/1955 | Lee et al. | 244/53 |
| 2,788,184 | 4/1957 | Michael | 244/53 |
| 2,932,945 | 4/1960 | Brandt, Jr. | 244/53 |
| 2,944,765 | 7/1960 | Lane et al. | |
| 2,999,656 | 9/1961 | Ward | 137/15.1 |
| 3,053,477 | 9/1962 | Reiniger | 244/53 B |
| 3,169,728 | 2/1965 | Messerschmitt et al. | 244/53 B |
| 3,222,863 | 12/1965 | Klees et al. | 244/53 B |
| 3,400,902 | 9/1968 | King | 244/53 |
| 3,474,988 | 10/1969 | Cox et al. | 244/53 |
| 3,485,252 | 12/1969 | Brown | 137/15.1 |
| 3,494,380 | 2/1970 | Martin | 244/53 B |
| 3,568,694 | 3/1971 | Johnson | 244/53 |
| 3,589,379 | 6/1971 | Daues et al. | 137/15.1 |
| 3,750,689 | 8/1973 | Britt | 137/15.1 |
| 4,012,013 | 3/1977 | Ball et al. | 244/53 |
| 4,418,708 | 12/1983 | Schulze et al. | 244/53 B |
| 4,437,627 | 3/1984 | Moorehead | 244/53 R |
| 4,502,875 | 3/1985 | Ballard | 244/53 R |

FOREIGN PATENT DOCUMENTS

| | | | |
|---|---|---|---|
| 1173345 | 7/1964 | Fed. Rep. of Germany | 244/53 B |
| 2070139 | 9/1981 | United Kingdom | 137/15.1 |

Primary Examiner—Joseph F. Peters, Jr.
Assistant Examiner—Lynn M. Fiorito
Attorney, Agent, or Firm—Pollock, Vande Sande & Priddy

[57] ABSTRACT

The inlet of a jet engine is equipped with a pivotally displaceable deflector which becomes deployed when the aircraft is in a stalled, horizontally stabilized condition. As the aircraft undergoes vertical descent, vertically impinging airflow is reflected off the interior surface of the deflector and flows coaxially through the inlet thereby forcing continued rotation of turbine blades. Hydraulic and electronic control devices deriving power from the turbine may be maintained operative even though the aircraft is in a stalled condition, thereby permitting limited horizontal maneuvering of the aircraft as the vertical descent continues.

3 Claims, 2 Drawing Sheets

U.S. Patent    Aug. 16, 1988    Sheet 1 of 2    4,763,858 ated control surfaces which are powered from the jet engine. Accordingly, in order to maintain the control of these surfaces, the engine turbine blades must be kept rotating to develop sufficient energy to power the hydraulic and electronic control systems as a jet aircraft vertically descends in a "deep stall" condition in preparation of an emergency crash landing.

DEFLECTABLE JET ENGINE INLET

FIELD OF THE INVENTION

The present invention relates to a deflectable jet engine inlet that is connected with a nacelle and usable at high angles of attack.

BACKGROUND OF THE INVENTION

In recent years, aircraft have been maneuvered in what has become known as a "deep stall" condition which effectively stops the forward velocity of an aircraft while maintaining its attitude in a controlled position. One researcher, Dale Reed of NASA Dryden Flight Research Center, has demonstrated the utilization of "deep stall" by moving horizontal stabilizers (or canards) of an aircraft into a 70° nose down attitude just as the aircraft is flown down to a stall speed. This researcher determined that, if the aircraft is moved rapidly from the 18° angle of attack normal stall to about 28°, the aircraft does not have sufficent time to roll off onto one wing. The aircraft subsequently falls downward in a horizontal attitude, under complete control of a downward deflected horizontal stabilizer which is not stalled.

The perfection of a "deep stall" procedure offers a significant possibility for landing an aircraft during an emergency situation such as engine flameout. Various means are being investigated to slow the vertical descent of an aircraft while they are in a "deep stall" condition and maintaining proper altitude. A suggested means for accomplishing lowered vertical descent includes the use of small rockets. A further alternative is the utilization of an unfurlable wing extension such as disclosed in co-pending U.S. Patent Application Ser. No. 826,514, assigned to the present assignee. In order to enhance the survival possibility during an emergency landing, various proposals have been made to cushion the landing impact by means such as the previously mentioned rockets as well as airbags deployed from the underside of an emergency landing aircraft. However, although it is possible to maintain proper attitude during "deep stall" and to also decrease the vertical descent of an aircraft during an emergency landing, it is necessary for an aircraft to have a minimum amount of horizontal maneuvering capability prior to landing in order to avoid obstacles such as trees and houses, as well as offering the possibility of landing on a runway if the emergency landing is in the near vicinity of a runway.

BRIEF DESCRIPTION OF THE PRESENT INVENTION

The present invention deals with a modification of the conventional jet engine housing inlet to permit the engine turbine blades to continue rotating during a "deep stall" vertical descent of an aircraft so that the turbine develops sufficient power to enable continued operation of the control surfaces of the aircraft, thereby permitting a pilot to horizontally maneuver his aircraft sufficiently to avoid obstacles just prior to an emergency landing.

Modern jet aircraft employs electrically controlled and hydraulically actuated control surfaces which are powered from the jet engine. Accordingly, in order to maintain the control of these surfaces, the engine turbine blades must be kept rotating to develop sufficient energy to power the hydraulic and electronic control systems as a jet aircraft vertically descends in a "deep stall" condition in preparation of an emergency crash landing.

The present invention accomplishes the requisite rotation of the turbine blades by deflecting air 90° from an encountered vertical air vector to a horizontal vector becomes redirected inwardly through the turbine blades. During normal operation of the aircraft, the air deflectors are retracted to a non-operative position. However, when the engine enters a "deep stall" condition, the deflectors are deployed to achieve the air deflection required to maintain control of the aircraft control surfaces.

Although air deflectors have been used at jet engine inlets for various purposes, none known to the applicants have the structure of the present invention dedicated to selectively direct airflow perpendicularly into a jet engine.

The above-mentioned objects and advantages of the present invention will be more clearly understood when considered in conjunction with the accompanying drawings, in which:

DETAILED DESCRIPTION OF THE PRESENT INVENTION

Figure 1:
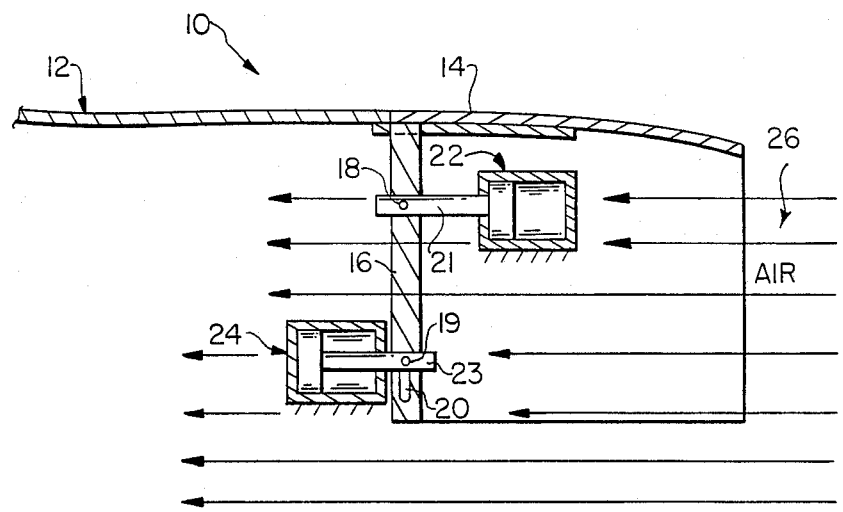
FIG. 1 is a cross-sectional schematic illustration of the present invention in a non-deployed condition.

Referring now to FIG. 1, the deflector assembly of the present invention is generally indicated by reference numeral 10 and is shown in the retracted position. The nacelle 12 is the jet engine housing and it is fitted with a movable upper outer skin section which forms the airflow deflector 14 of the present invention. Movement of the deflector 14 to a deployed position is shown in FIGS. 2 and 3.

Figure 2:
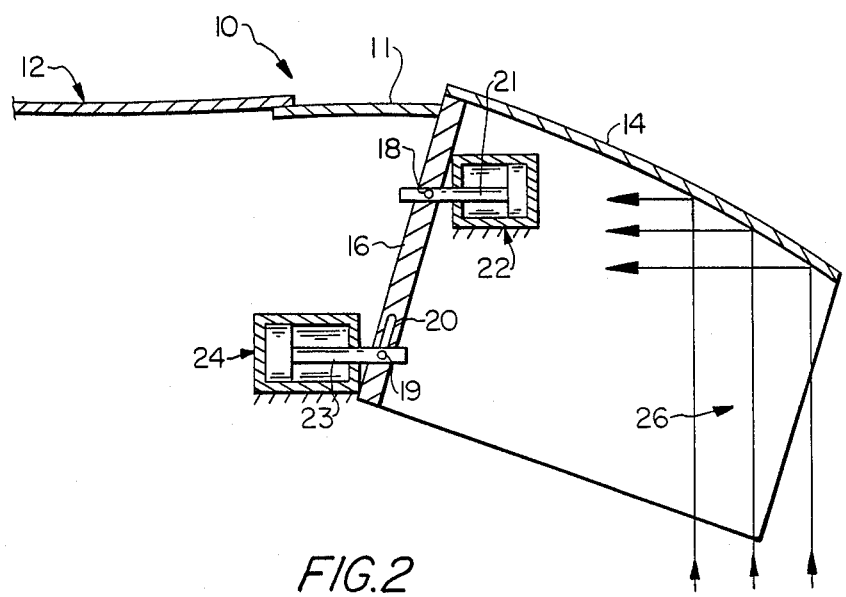
FIG. 2 is a partial sectional schematic illustration of the present invention in a deployed condition.
Figure 3:
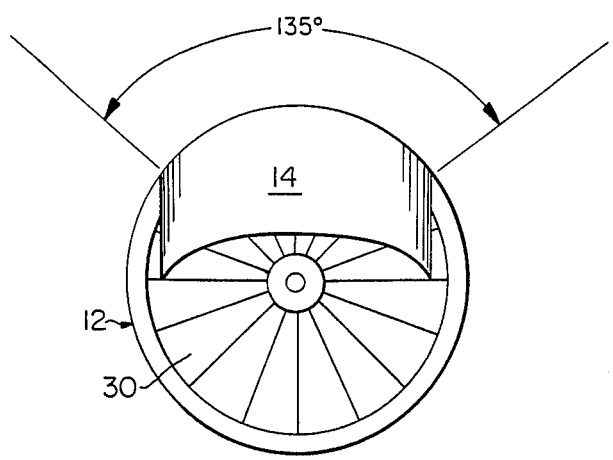
FIG. 3 is a front elevational view of a nacelle with the inventive deflector deployed.

With continued reference to FIG. 1, a lever 16 is connected to the deflector 14; and upon appropriate action of the actuators 22 and 24, the deflector 14 is moved from the retracted position of FIG. 1 to the pivotally deployed position of FIG. 2. The actuators may be of the hydraulic or solenoid type, having their housings fixed and actuator arms extensible. For example, in the retracted position of FIG. 1, the upper actuator arm 21 is fully extended while the lower arm 23 is fully retracted, thereby maintaining the lever arm 16 generally perpendicular to the surface of the nacelle 12. Airflow 26 is directed axially through the nacelle 12 and this represents the normal operating condition of an aircraft.

When an aircraft is in a emergency situation and a stabilized vertical descent with proper attitude is to be maintained, the actuator arm 21 is retracted while the housing of actuator 22 remains fixed. If the actuator arm 19 is maintained in a retracted position while the housing of actuator 24 is maintained in a fixed condition, the deflector 14 will be pivoted outwardly and downwardly as shown in FIG. 2. This is due to the pivotal connection between arm 21 and lever 16 at pivot 18. To ensure pivotal freedom, a slot 20 is formed in the lower portion of lever 16 to enable adjustable displacement of pivot 19 of actuator arm 23 within the elongated slot 20.

Adjustments to the pivotal angle of deflector 14 may be made by adjusting the extension of the actuators 22 and 24, relative to each other. As will be appreciated by viewing FIG. 2, as vertical airflow encounters deflector 14 during stabilized vertical descent of an aircraft, the internal surface of the deflector redirects the airflow by 90°. This redirected airflow flows axially through the nacelle 12 to impart sufficient rotation of turbine blades 30 rearwardly of the nacelle to maintain sufficent power for control surface devices, as will be explained in greater detail in connection with FIG. 4. A skin panel 11 is connected between a rear section of deflector 14 and the outer edge portion of nacelle 12 in order to eliminate the opening that would be created upon the pivotal displacement of deflector 14, as shown in FIG. 2. It is anticipated that the deployed deflector 14 will operate satisfactorily if it has a dimensional arc of approximately 135°, as shown in FIG. 3.

Although the present invention has been discussed in connection with two actuators 22 and 24, it is to be understood that this simple configuration of actuators is chosen to explain the concept of the present invention and, in fact, many different types of devices may be employed to pivotally displace deflector 14 to the deployed position of FIG. 2.

Figure 4:
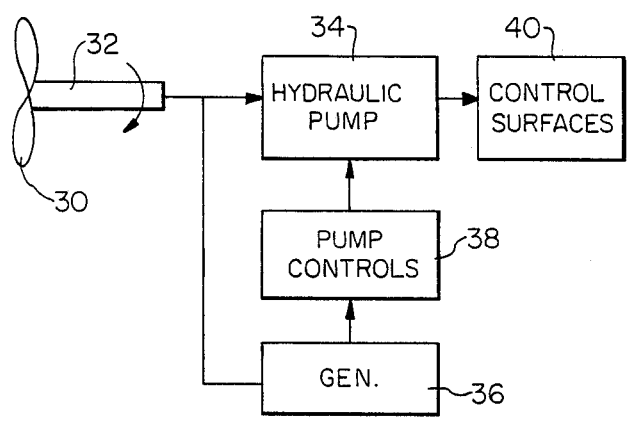
FIG. 4 is a block diagram of a control surface system.

Referring to FIG. 4, redirected airflow across the turbine blades 30 causes the turbine shaft 32 to continue rotating at least with sufficient power to maintain the operation of the aircraft control surface actuating system. This would include hydraulic pump 34, which is powered by shaft 32 as is generator 36, which generates sufficent electricity to maintain pump control 38 in an operational state. With pump 34 and controls 38 operational, the control surfaces 40 of an aircraft may be controlled by a pilot, allowing him to slightly maneuver the aircraft horizontally at the end of the near-vertical descent just prior to crash landing. As previously mentioned, this provides the pilot with an opportunity to maneuver away from obstacles such as trees, houses, and the like. Accordingly, the survivability of a crash landing is enhanced by virtue of utilizing the present invention.

Although the present invention has been described in terms of emergency conditions, it is to be understood that the discussed deflector may also be deployed during tactical maneuvering when the aircraft is operated at high angles of attack, a condition that might otherwise be accompanied by low air intake into a jet engine inlet that can cause engine stall.

It should be understood that the invention is not limited to the exact details of construction shown and described herein, for obvious modifications will occur to persons skilled in the art.

We claim:

1. A system for ensuring continued power to the control surfaces of an aircraft during vertical descent of a horizontally oriented jet aircraft with a stalled engine, the system comprising:
    a deflector having an internal transversely arcuate surface with respect to an axis of the jet engine inlet and normally positioned substantially coaxial with the jet engine inlet for allowing unobstructed airflow through the inlet when the aircraft has substantial horizontal velocity; and
    means for pivotally displacing the arcuate deflector relative to the inlet when the aircraft undergoes vertical descent in a horizontal, stalled condition, thereby causing an interior surface of the deflector to reflect impinging vertical airflow only in a perpendicular direction, coaxial with the inlet for forcing sufficient airflow across the turbine blades of the engine to keep them rotating;
    hydraulic means connected to a shaft of the turbine blades;
    electric generating means connected to the shaft; and
    control means connected to the generating means and the hydraulic means for driving control surfaces of the aircraft sufficient to allow horizontal maneuvering of the stalled aircraft as the turbine blades and connected shaft are kept rotating by the reflected airflow.

2. A method for selectively deflecting airflow through a jet engine inlet comprising the steps:
    maintaining an air deflector, having an internal transversely arcuate surface with respect to an inlet axis, in a non-obstructive position relative to the inlet during normal operation of an aircraft; and
    displacing the arcuate deflector outwardly from the inlet in response to a stalled engine condition thereby redirecting vertical airflow in a direction substantially only perpendicular, coaxial with the inlet when the aircraft undergoes vertical descent while being in an engine stalled horizontal condition.

3. The method set forth in claim 2 together with the steps of forcing the redirected flow across turbine blades of the engine to keep them rotating;
    powering hydraulic actuator means from a shaft connected to the turbine blades;
    powering an electric generator connected to the shaft; and
    connecting control means to the generator for controlling the hydraulic actuator which is connected to the control surfaces of the aircraft thereby enabling the aircraft to undergo horizontal maneuvering while in a stalled condition as the turbine blades and connected shaft are kept rotating by the redirected airflow.

* * * * *

UNITED STATES PATENT AND TRADEMARK OFFICE
CERTIFICATE OF CORRECTION

PATENT NO. : 4,763,858
DATED : August 16, 1988
INVENTOR(S) : Joseph A. Belisle, et al.

It is certified that error appears in the above-identified patent and that said Letters Patent is hereby corrected as shown below:

Column 2, line 57, change "a emergency" to --an emergency--.

Signed and Sealed this

Twentieth Day of December, 1988

*Attest:*

DONALD J. QUIGG

*Attesting Officer*  *Commissioner of Patents and Trademarks*